United States Patent [19]
Armstrong et al.

[11] Patent Number: 5,815,796
[45] Date of Patent: Sep. 29, 1998

[54] METHOD FOR DETERMINING PARAMETERS FOR THE DESIGN OF GROUND EQUIPMENT FOR A SATELLITE LINK SYSTEM AND A METHOD OF TRANSMITTING SIGNALS IN A SATELLITE LINK SYSTEM

[75] Inventors: Robert Athol Armstrong, Berowra; John Joseph Phillips, Matraville, both of Australia

[73] Assignee: Spatial Communications Pty. Ltd., Australia

[21] Appl. No.: 373,286

[22] PCT Filed: Jul. 9, 1993

[86] PCT No.: PCT/AU93/00339

§ 371 Date: Jan. 4, 1995

§ 102(e) Date: Jan. 4, 1995

[87] PCT Pub. No.: WO94/01940

PCT Pub. Date: Jan. 20, 1994

[30] Foreign Application Priority Data

Jul. 9, 1992 [AU] Australia .................. PL3413

[51] Int. Cl.$^6$ .................................................. H04B 1/60
[52] U.S. Cl. ............ 455/10; 455/12.1; 455/13.4; 455/63; 455/427; 455/505; 455/67.1
[58] Field of Search .................. 455/9, 10, 12.1, 455/52.1, 52.2, 63, 69, 70, 67.1, 427, 428, 430, 8, 13.4, 505, 504, 296; 342/352

[56] References Cited

U.S. PATENT DOCUMENTS 4,752,967  6/1988  Bustamante et al. .
4,776,035  10/1988 Duggan .
4,819,227  4/1989  Rosen .
4,831,619  5/1989  Rosen .
4,888,596  12/1989 Conanan ............................ 455/52.2
4,896,369  1/1990  Adams, Jr. et al. .
4,905,235  2/1990  Saburi .
5,060,292  10/1991 Ayukawa et al. .

FOREIGN PATENT DOCUMENTS 1173929  7/1989  Japan .................................. 455/10
1176125  7/1989  Japan .................................. 455/10
1186022  7/1989  Japan ............................... 455/52.2
3198438  8/1991  Japan ............................... 455/52.2

OTHER PUBLICATIONS

Moupfouma, F., "Rain Induced Attenuation Prediction Model for Terrestrial and Satellite–Earth Microwave Links," *Annales des Telecomminucations*, vol. 42, No. 9–10, Sep.–Oct. 1987, pp. 539–550.

Primary Examiner—Doris H. To
Attorney, Agent, or Firm—Killworth, Gottman, Hagan & Schaeff

[57] ABSTRACT

A method of determining parameters for the design of ground equipment for satellite link systems using duplex links is disclosed. The method has particular application to determining transponder power requirements and antenna size. The method comprises selecting required availability of the satellite system and ground sites for the equipment and determining site degradation parameters for the ground sites. A range where no up link power control is required is also determined and a point of minimum transponder power is determined to enable the parameters to be selected.

14 Claims, 2 Drawing Sheets

METHOD FOR DETERMINING PARAMETERS FOR THE DESIGN OF GROUND EQUIPMENT FOR A SATELLITE LINK SYSTEM AND A METHOD OF TRANSMITTING SIGNALS IN A SATELLITE LINK SYSTEM

BACKGROUND OF THE INVENTION

This invention relates to a method of determining parameters for the design of ground equipment for satellite link systems utilising duplex links.

DESCRIPTION OF THE PRIOR ART

Typical satellite link systems for duplex links include at least two ground stations and an orbiting satellite. The ground stations transmit and receive signals to and from one another via the satellite. Typical satellite link designs for duplex links implement a duplex link as two separate simplex links. When signals are transmitted in the higher bands, for example, the Ku or Ka band (11 to 14 GHz) the signals can be affected by rain and therefore this must be taken into account when designing satellite link systems. A location in which this factor must be considered in designing satellite link systems is in tropical regions where heavy rain can be expected in some parts of the year. The invention also has application in semi and non tropical regions as well.

In order to ensure that the system will be available for use in such environments systems are normally designed to operate or to be available a specific proportion of time, say 99.5% of the time. Availability 99.5% of the time is acceptable to commercial users utilising the satellite link system for communication purposes such as telephone communication and other types of communication. Thus, the need to ensure that the system is available 99.5% of the time means that the ability to transmit when rain is present at one or both of the ground stations must be taken into account when designing the ground equipment and in particular transmitter power requirements and antenna size. Minimization of transmitter power requirements and also antenna size is most desirable and represents significant cost saving in both production of the ground site and also use of the equipment at the ground site during operation of the system.

Conventional systems employ a facility known as uplink power control to increase availability by reducing the effect of rain fading on uplink signals transmitted from the ground station to the satellite. Uplink power control basically alters the output power of the transmitter at the ground station during rainy conditions to maintain the intensity of the signal received by the satellite at a constant level. Thus, in clear conditions power output of the transmitter is reduced but in rainy conditions the uplink power control increases transmitter power so that the uplink signals penetrate the precipitation and a signal arrives at the satellite which is generally equal to that which is provided in clear conditions.

For many duplex links designed in this way the uplink power control at a particular site maintains uplink availability long after the downlink (that is the signal transmitted from the satellite to the ground equipment) into the same site has failed. This effect is particularly true for connections which are downlink power limited, even to the extent that the uplink power control serves no purpose.

The basic problem is that calculating a duplex link as two simplex links in opposite directions ignores a fundamental principle of probability and results in the designs being optimistic in their availability claim. For example, assume a "duplex" circuit between two earth stations, X and Y, has four component links:

Link A—Uplink from X to Satellite.
Link B—Downlink from Satellite to Y.
Link C—Uplink from Y to Satellite.
Link D—Downlink from Satellite to X.

If any one of the component links becomes unavailable the entire duplex circuit is unavailable.

The conventional method of designing such an end to end "duplex" link or circuit is to decide the required availability, eg 99.5%. Given this target Link A could be engineered to give 99.8% availability and Link B to give 99.7%. Conventional calculations then give an end to end link availability of 99.5%. This is correct for the simplex path between X and Y. To complete the conventional "duplex" link the procedure is repeated between Y and X. For example Link C could be engineered for 99.9% availability and Link D for 99.6%. Again conventional calculations give the end to end availability of 99.5%.

Unfortunately the conventional method ignores the fact that component Links A and D have dependent availability, and the same is true of Links B and C. The basis of this dependency is that rain at Station X affects Links A and D (likewise at Y it affects Links B and C). In C Band, being far less vulnerable to rain, this has insignificant effects. However in the higher bands, X Band and above, the effects or rain attenuation are significant. Reanalysing the above example as a true duplex circuit reveals that the actual end to end availability is 99.3%.

The object of this invention is to provide a method for determining parameters for ground equipment (in particular, but not exclusively, for transmitter power requirement and antenna size), which can minimise capital and operational cost of an earth station.

Surprisingly, we have found by use of the method according to this invention that uplink power control facility can, in most cases, be completely done away with and in other cases can be reduced to a minimum while still obtaining the required availability of the satellite link system.

SUMMARY OF THE INVENTION

The invention may be said to reside in a method of determining parameters for the design of ground equipment for a satellite link system utilising duplex links comprising:

selecting a required availability of the satellite system;

choosing ground sites for ground equipment;

determining site degradation parameters for the ground sites;

determining an operating range where no uplink power control is required; and determining a point of minimum transponder power;

such that parameters of the ground equipment required to transmit the duplex signal can be selected for the design of the ground equipment.

Thus, according to the invention it is possible to minimise the design of ground equipment so that minimum transponder power and minimum antenna size, for example, can be utilised while still obtaining the required availability of the system. Thus, the cost of the ground site installations is reduced as is the cost of operating those sites.

Preferably the method also includes the steps of checking that the minimum transponder power falls within the non-uplink power control region and if so selecting parameters for the design of the ground equipment which do not require uplink power control facility.

In other embodiments if the minimum transponder power requirement does fall within the uplink power control region a minimum amount of uplink power control can be utilised to provide the required availability or an increase in transponder power can be utilised.

In one embodiment of the invention where the point of minimum transponder power does not fall in a range where no uplink power control is required, the method includes a technique of iteration whereby new earth station parameters are selected until a point of minimum transponder power for those parameters is determined which falls within the range where no uplink power control is required.

Preferably the step of determining the range where no uplink power control is required comprises the steps of:

determining a first uplink rain attenuation function relating rain attenuation to the percentage of time for which this rain attenuation is exceeded at a first ground site;

determining a second uplink rain attenuation function relating rain attenuation to the percentage of time for which this rain attenuation is exceeded at a second ground site;

determining a first downlink rain degradation function relating rain degradation to the percentage of time for which this rain degradation is exceeded at the first ground site;

determining a second downlink rain degradation function relating rain degradation to the percentage of time for which this rain degradation is exceeded at the second site;

calculating the first and second uplink rain attenuation functions and calculating the first and second downlink rain degradation functions against outage time for the first and second sites with the second uplink attenuation function and second downlink degradation function having their Y axes drawn at a predetermined outage time of the first uplink attenuation function and first downlink degradation function and with the X scale inverted so that the predetermined outage time of the second uplink attenuation function and second downlink degradation function occur at zero availability for the first uplink attenuation function and first downlink degradation function;

and determining where the first uplink rain attenuation function intersects the second downlink rain degradation function to define a first point and determining where the second uplink rain attenuation function intersects the first downlink rain degradation function to define a second point;

uplink power control being required at the first site if the outage time at the first site is less than that at the first point and uplink power control is not required at the second site if the outage time allocated at the first site is less than that of the second point;

if the first point occurs at an outage time at the first site which is less than the outage time at the first site for the second point then uplink power control is not needed at either site for outage times at the first site between the two points; and if the first point occurs at an outage time at the first site which is greater than the outage time at the first site for the second point then uplink power control is needed at both sites for outage times at the first site between the two points.

Preferably the system operates in any band subject to rain attenuation.

The step of determining the functions should be understood to mean either making a physical graph or merely solving the functions mathematically by computer or otherwise to obtain the first and second points.

BRIEF DESCRIPTION OF THE DRAWINGS

The preferred embodiment of the invention will be described in more detail, by way of example, with reference to the accompanying drawings in which.

DETAILED DESCRIPTION OF THE INVENTION

Figure 1:
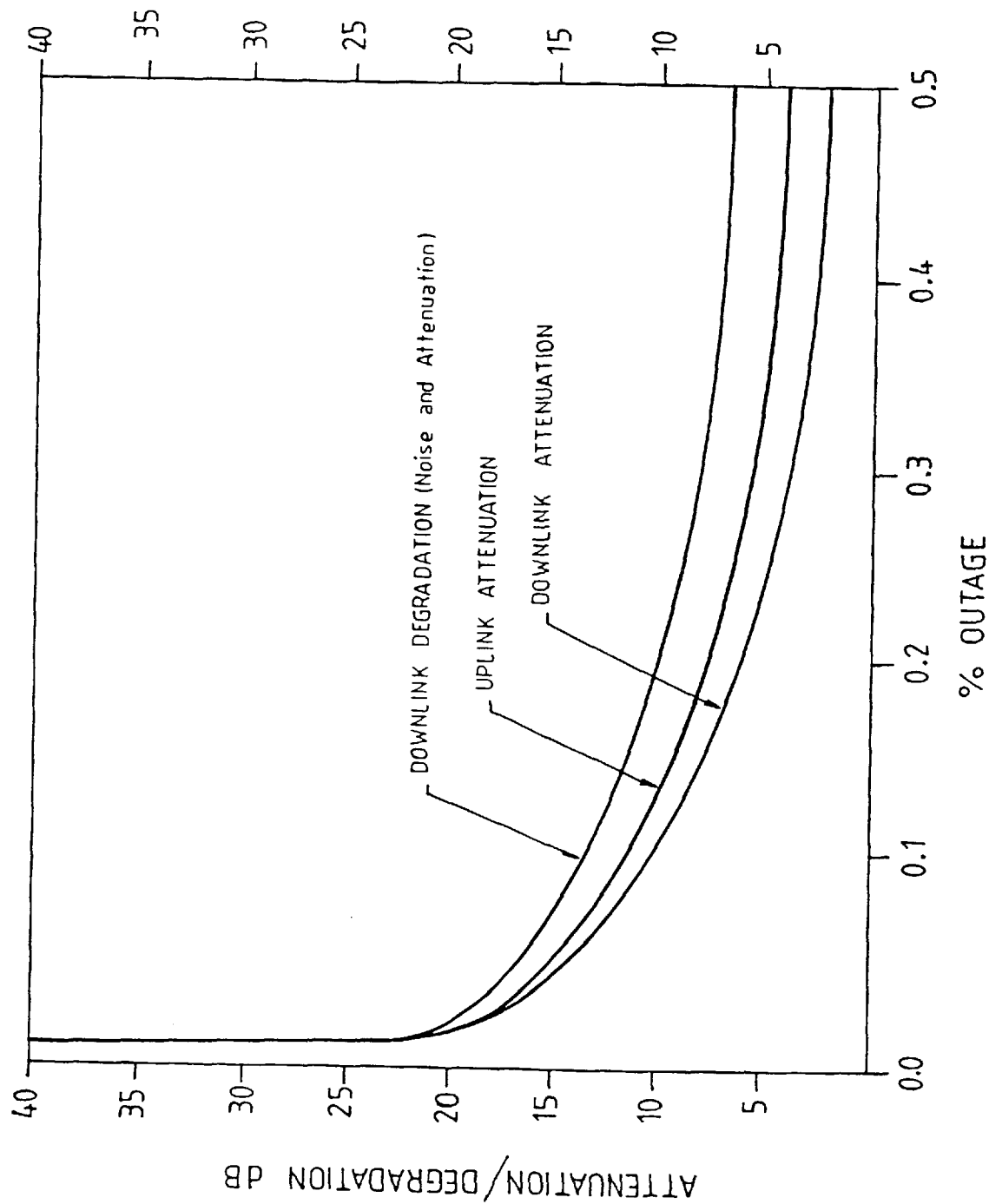
FIG. 1 is a graph showing attenuation/degradation probability curves.

In the preferred embodiment of the invention the following variable functions are used and defined hereinunder.

$f_{ru1}(x_1)$=Uplink Rain Attenuation Function relating Rain Degradation to the percentage of time for which this Rain Attenuation is exceeded at site A in Decibels.

$f_{ru2}(x_2)$=Uplink Rain Attenuation Function relating Rain Degradation to the percentage of time for which this Rain Attenuation is exceeded at site B in Decibels.

$f_{rd1}(x_1)$=Downlink Rain Degradation Function relating Rain Degradation to the percentage of time for which this Rain Degradation is exceeded at site A in Decibels.

$f_{rd2}(x_2)$=Downlink Rain Degradation Function relating Rain Degradation to the percentage of time for which this Rain Degradation is exceeded at site B in Decibels.

x1=Percentage of downtime at site A (rain degradation limit exceeded).

x2=Percentage of downtime at site B (rain degradation limit exceeded).

TPD(x)=Relative Transponder Power as a function of rain degradation time for carriers dimensioned for downlink requirements for a duplex circuit in dBr.

DT=Total percentage of downtime for which a duplex link is designed.

SA1=Site advantage of site A (the total effect of G/T difference and satellite EIRP difference for that site). If the site has a total receive advantage then this figure is positive, if not the figure is negative.

If x1 represents the percentage of time for which a duplex circuit is degraded at site A, x2 represents the percentage of time for which a circuit is degraded at site B and y represents the percentage of time for which either circuit (and therefore a duplex link) is degraded then the following relationship applies:

$$1-y=(1-x1)(1-x2)$$

This can be expanded as follows;

$$1-y=1-x1-x2+x1x2$$

Which reduces to;

$$y=x1+x2-x1x2$$

If x1 and x2 are very small then the term x1x2 approaches zero and;

$$y=x1+x2$$

is a good approximation; Therefore it can be stated that;

$$DT=x1+x2$$

And;

$$x2=DT-x1.$$

For example if a required availability of 99.5% is selected then downtime equals 0.5%. Uplink frequencies of approximately 14.25 GHz are selected. Site A and site B are known by their latitude and longitude and site degradation parameters (that is rainfall data) for those sites is obtained from data banks, CCIR Rain Model or other more improved data. Furthermore, an initial transponder power requirement is assumed and, for example, both site A and site B transponders might require ten watt transmitters. The downlink rain degradation functions can be expressed as follows:

$$f_{rd1}(x1) = f_{rd1}(DT-x2) \quad \quad \quad 1$$

$$f_{rd2}(x2) = f_{rd2}(DT-x1) \quad \quad \quad 2$$

For carriers dimensioned for a fully downlink rain degradation limited situation the relative transponder power is given by:

$$TPD(\chi_1) = 10\log[10^{\left[\frac{f_{rd1}(x1)-SA1}{10}\right]} + 10^{\left[\frac{f_{rd2}(DT-x1)}{10}\right]}] \quad 3$$

The site A downtime x1 for which the transponder power is minimum is found by solving:

$$TPD'(x1)=0; \quad \quad \quad (4)$$

As both degradation functions are usually determined empirically it is extremely difficult to solve equation 4 above. However, a solution can be found using conventional numerical computing methods. This method can be applied graphically. The functions $f_{rd1}(x1)$ and $f_{rd2}(DT-x1)$ are plotted on the same axes together with $f_{ru1}(x1)$, $f_{ru2}(DT-x1)$ and $TPD(x1)$. From this it is possible to determine the two carrier sizes necessary at any site downlink rain degradation combination which gives the required duplex link availability. It is also possible to determine whether or not the level of a particular carrier is sufficient for the uplink attenuation expected at the transmitting site. If the uplink is insufficient, uplink power control will be needed at the uplinking site. From the relative transponder power curve it is possible to determine the site outage times at which the transponder power is minimum, and the excess transponder power needed for any other operating point.

To determine the downlink degradation function it is necessary to sum the effects of downlink attenuation and the noise temperature degradation which results from the elevated temperature of the attenuating rain. The noise temperature degradation effect is dependent on the receive system noise temperature as well as the levels of uplink and transponder intermodulation noise.

With reference to FIG. 1 which shows typical downlink and uplink attenuation functions as well as the downlink degradation function. This is for a typical Ku band downlink limited link where the rain derived received noise temperature results in the downlink degradation exceeding the uplink attenuation at the same site. The downlink attenuation is lower because the attenuation at 12 GHz is lower than the attenuation at 14 GHz.

Figure 2:
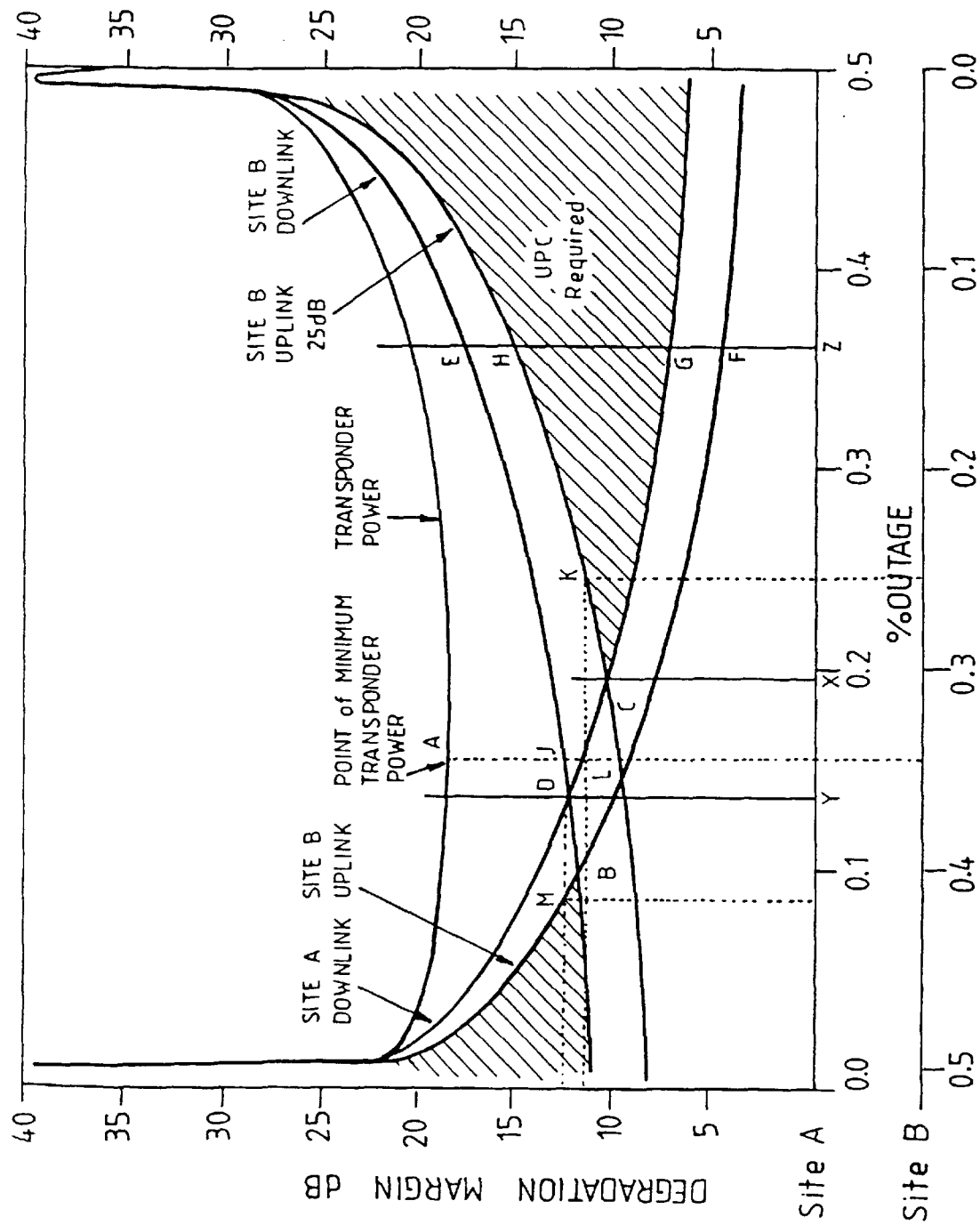
FIG. 2 is a graph showing joint probability curves.

FIG. 2 shows two sets of downlink degradation and uplink attenuation curves, the first of which is as for FIG. 1. The second curve has its Y axis drawn at the 0.5% outage time of the original graph and the X scale is inverted so that for the two right hand curves, 0.5% availability occurs at 0 availability for the first curve. An availability of 99.5% is used in this example but the method is applicable to any availability level.

With reference to FIG. 2, two important points can be observed. Firstly, the point at which the transponder power is minimised (point A) and secondly, the point at which the two downlink degradation lines cross (point D). The latter point is the point at which the rain fade margin for both carriers would need to be equal. Also, another important feature of the transponder power curve is that it is extremely flat with very little increase in transponder power on either side of the minimum point. This power curve example is for two sites having equal site performance, if one site has an advantage this power curve is skewed to one side. It is interesting to note from this example that if the point of equal downlink rain degradation is chosen as the operating point, the station having the more favourable weather conditions would be operating with a higher path availability (in this case 99.865%) whilst the station experiencing bad weather conditions would have only 99.635% link availability. At this operating point, the transponder utilisation is only marginally more than for the minimum point of the transponder power.

The graph of FIG. 2 enables a range to be determined where no uplink power control is required and that range is between the points B and C in FIG. 2. In the examples shown the point of minimum transponder power falls within that range and therefore selected parameters relating to the design of the ground equipment such as transponder power requirement and antenna size can be selected to be a minimum in order to provide the availability which is required and therefore the cost of installing the ground site and also operation of the ground site can be minimised.

It should be noted that in FIG. 2 the shaded area represents regions where uplink power control would be required in order to provide the desired availability of the system. Conventional methods for determining the parameters of designs result in uplink power control facilities being required in order to provide the required availability of the system. Thus, the preferred embodiment of the invention provides a method whereby in many cases it will be possible to design installations which do not require uplink power control and which therefore are of reduced installation cost and also reduced operational cost.

The effect of moving the transponder operating point away from point D shown in FIG. 2 will now be described. Firstly if an operating point is chosen for line Z, station A must transmit a very large signal illustrated by point E to cover the rain attenuation expected at site B. This signal being uplinked from site A would only experience attenuation as shown at point F, therefore this carrier being uplinked from station A to a station at site B would not require uplink power control to operate. However, the return circuit (the signal transmitted from the station at site B to the station at site A) would need to transmit a carrier at the level illustrated at point G. This signal being uplinked from site B would experience more attenuation than the degradation of its downlink. It would therefore be necessary for uplink power control to be provided at site B to ensure that the required performance is achieved.

The amount of the uplink power control needed to achieve this is the amount illustrated by the difference in the attenuation at points G and H (in this case 8 dB). The amount of transponder power needed to support this operating point is actually 3.0 dB higher than the minimum possible (Point A).

Thus should the point of minimum transponder power fall in the region where uplink power control is required design parameters can be selected to result in the minimum amount of uplink power control being incorporated in the system or an increase in the transponder power could be selected so as to bring the point A back into the region where no uplink power control is required.

The next important point to observe is the point which is intersected by line X. At this point the downlink required in to site A suffers the same attenuation as its associated uplink being transmitted from site B. This circuit therefore does not need uplink power control as both the uplink and associated downlink would fade at the same time. It is also important to note that the signal transmitted from site A to site B would experience more downlink attenuation than uplink attenuation, and therefore this carrier would also not need uplink power control to operate at this point.

The same conditions as illustrated for lines X and Z occur to the left of the equal downlink fade degradation point as on the right. It is therefore important to note that for lines between points B and C, no uplink power control is required to achieve operation. It is also important to note that the minimum transponder power usually falls between points B and C. This means that there is no advantage in the use of uplink power control as it does not reduce the transponder power requirement. When an uplink power control advantage is indicated, it is usually very small, less than 0.5 DB.

For simplex circuits, much larger uplink power control advantages could be obtained because the transmitting site has no receive responsibility. For a duplex circuit, the advantage of the uplink power control is not realised because the duplex availability at the transmit site is limited by the availability of the downlink at the same site.

At a point, such as that illustrated by Point A, the complementary site downlink availabilities are Site B—99.655% (Point J) and Site A—99.845% (Point L). The Site A uplink power margin required to offset the fade is 12.5 dB with the result that Site A's uplink availability is 99.915% (Point M). Similarly the Site B uplink power margin required to overcome the fade margin is 11.5 dB which gives Site B an uplink availability of 99.745% (Point K).

The preferred embodiment in terms of a mathematical description of the method can be described using the same variable functions as defined herein.

The mathematical solution is as follows:

1. Solve TPD'(x1)=0 to obtain $x_{1m}$ which is minimum Transponder power point.
2. Solve $f_{ru1}(x1)=f_{rd2}(x2)$ to obtain $x_{1L}$ which is lower limit of non uplink power control.
3. Solve $f_{rd1}(x1)=f_{ru2}(x2)$ to obtain $x_{1u}$ which is upper limit of non uplink power control.
4. If $x_{1L} \leq x_{1m} \leq x_{1u}$ is true, then configure links using $x_{1m}$ as the operating point.
5. If $x_{1L} > x_{1m}$, then configure links using $x_{1L}$ as the operating point.
6. If $x_{1u} < x_{1m}$, then configure links using $x_{1u}$ as the operating point.
7. If condition in 5 or 6 exist, then antenna gains can be increased at either end. The cost of this increased gain would then be compared to the cost of using the additional transponder power that 5 or 6 require to find the most cost effective solution.
8. If $x_{1u} \leq x_{1L}$ then configure links using $x_{1m}$ as the operating point. Use the difference between $f_{rd1}(x1)$ and $f_{ru2}(x2)$ to determine the amount of uplink power control required at site 1 and likewise the difference between $f_{ru1}(x1)$ and $f_{rd2}(x2)$ to determine the amount of uplink power control at site 2. If the amount of required uplink power control required is small, it may be cheaper to use more transponder power or improve the antenna gains at either or both of the sites, thereby producing within the method a range of operating points where no uplink power control is required, as above.

Advantages of the preferred embodiment of the invention are as follows:

(a) the best possible use is made of the statistical rainfall data to dimension carriers for duplex links;

(b) the carrier sizes allocated are more uniform across the transponder, meaning that smaller carriers suffer less gain compression, and are less subject to adjacent carrier interference;

(c) no carriers with very small margins are allocated. Such small carriers are more prone to losses in continuity which may result from small degradations in earth station performance such as could be caused by obstructions falling on the antenna, insects building their nest in the antenna feed or similar events;

(d) the clear sky operating bit error rates are optimized. If one of the carriers is much smaller than the other, the bit error rate on that carrier would be very high while the other would achieve a much lower bit error rate. For this design the bit error rate is optimised for both halves of the link;

(e) the availabilities of the two circuits in a duplex link have maximum overlap; and (f) the identification of the true value of Uplink Power Control enables the design to minimise the capital cost of ground equipment by avoiding the use of UPC when no significant advantage arises from its use; and (g) transponder power utilisation is minimised.

The most important result of this method of rain fade margin allocation is the observation that uplink power control for duplex circuits is of such little use as to represent no economic or other advantage for earth stations which are downlink thermal noise limited having similar site advantages. The method can be used to optimise circuits with; intermodulation or uplink noise limitations; or large differences in site performance, but in these cases, it may be necessary to employ UPC in order to minimise transponder utilisation.

Since modifications within the spirit and scope of the invention may readily be effected by persons skilled within the art, it is to be understood that this invention is not limited to the particular embodiment described by way of example hereinabove.

We claim:

1. A method of determining parameters for the design of ground equipment for a satellite link system utilising duplex links comprising:

selecting a required availability of the satellite system;

choosing at least first and second ground sites for ground equipment;

determining site degradation parameters for the ground sites;

determining an operating range where no uplink power control is required; and determining a point of minimum transponder power;

such that parameters of the ground equipment required to transmit the duplex signal can be selected for the design of the ground equipment.

2. The method of claim 1, including the steps of checking that the minimum transponder power falls within the non-uplink power control region and if so selecting parameters for the design of the ground equipment which do not require uplink power control facility.

3. The method of claim 1, wherein if the minimum transponder power requirement does fall within the uplink power control region a minimum amount of uplink power control can be utilized to provide the required availability or an increase in transponder power can be utilized.

4. The method of claim 1, wherein if the point of minimum transponder power does not fall in a range where no uplink power control is required, the method includes a technique of iteration whereby new site degradation parameters are selected until a point of minimum transponder power for those parameters is determined which falls within the range where no uplink power control is required.

5. The method of claim 1, wherein the step of determining the range where no uplink power control is required comprises the steps of:

determining a first uplink rain attenuation function relating rain attenuation to the percentage of time for which this rain attenuation is exceeded at a first ground site;

determining a second uplink rain attenuation function relating rain attenuation to the percentage of time for which this rain attenuation is exceeded at a second ground site;

determining a first downlink rain degradation function relating rain degradation to the percentage of time for which this rain degradation is exceeded at the first ground site;

determining a second downlink rain degradation function relating rain degradation to the percentage of time for which this rain degradation is exceeded at the second site;

calculating the first and second uplink rain attenuation functions and calculating the first and second downlink rain degradation functions against outage time for the first and second sites with the second uplink attenuation function and second downlink degradation function having their Y axes drawn at a predetermined outage time of the first uplink attenuation function and first downlink degradation function and with the X scale inverted so that the predetermined outage time of the second uplink attenuation function and second downlink degradation function occur at zero availability for the first uplink attenuation function and first downlink degradation function;

and determining where the first uplink rain attenuation function intersects the second downlink rain degradation function to define a first point and determining where the second uplink rain attenuation function intersects the first downlink rain degradation function to define a second point;

uplink power control being required at the first site if the outage time at the first site is less than that at the first point and uplink power control is not required at the second site if the outage time allocated at the first site is less than that of the second point;

if the first point occurs at an outage time at the first site which is less than the outage time at the first site for the second point then uplink power control is not needed at either site for outage times at the first site between the two points; and if the first point occurs at an outage time at the first site which is greater than the outage time at the first site for the second point then uplink power control is needed at both sites for outage times at the first site between the two points.

6. The method of claim 1, wherein the system operates in any band subject to rain attenuation.

7. The method of claim 1, wherein the range where no uplink power control is required is calculated as follows:

a. solve $TPD'(x1)=0$ to obtain $x_{1m}$ which is minimum Transponder power point, b. solve $f_{ru1}(x1)=f_{rd2}(x2)$ to obtain $x_{1L}$ which is lower limit of non uplink power control, c. solve $f_{rd1}(x1)=f_{ru2}(x2)$ to obtain $x_{1u}$ which is upper limit of non uplink power control, d. if $x_{1L} \leq x_{1m} \leq x_{1u}$ is true, then configure links using $x_{1m}$ as the operating point, e. if $x_{1L} > x_{1m}$, then configured links using $x_{1L}$ as the operating point, f. if $x_{1u} < x_{1m}$, then configure links using $x_{1u}$ as the operating point, g. if condition in e or f exist, then antenna gains can be increased at either end, h. if $x_{1u} \leq x_{1L}$ then configure links using $x_{1m}$ as the operating point and use the difference between $f_{rd1}(x1)$ and $f_{ru2}(x2)$ to determine the amount of uplink power control required at the first site and likewise the difference between $f_{ru1}(x1)$ and $f_{ru2}(x2)$ to determine the amount of uplink power control at the second site.

8. A method of transmitting signals in a satellite link system utilizing duplex links comprising:

selecting a required availability of the satellite system;

determining site degradation parameters for first and second ground sites;

determining an operating range where no uplink power control is required;

determining a point of minimum transponder power; and transmitting the signals from the first ground site to the second ground site via the satellite system.

9. The method of claim 8, further comprising the steps of checking whether the minimum transponder power falls within the non-uplink power control region and, if so, transmitting the signals without uplink power control.

10. The method of claim 8, wherein if the minimum transponder power requirement does fall within the uplink power control region a minimum amount of uplink power control can be utilized to provide the required availability or an increase in transponder power can be utilized.

11. The method of claim 8, wherein if the point of minimum transponder power does not fall in a range where no uplink power control is required, the method includes a technique of iteration whereby new site degradation parameters are selected until a point of minimum transponder power for those parameters is determined which falls within the range where no uplink power control is required.

12. The method of claim 8, wherein the step of determining a range where no uplink power control is required comprises the steps of:

determining a first uplink rain attenuation function relating rain degradation to the percentage of time for which this rain degradation is exceeded at a first ground site;

determining a second uplink rain attenuation function relating rain attenuation to the percentage of time for which this rain attenuation is exceeded at a second ground site;

determining a first downlink rain degradation function relating rain attenuation to the percentage of time for which this rain attenuation is exceeded at the first ground site;

determining a second downlink rain degradation function relating rain degradation to the percentage of time for which this rain degradation is exceeded at the second site;

calculating the first and second uplink rain attenuation functions and calculating the first and second downlink rain degradation functions against outage time for the first and second sites with the second uplink attenuation function and the second downlink degradation function having their Y axes drawn at a predetermined outage time of the first uplink attenuation function and first downlink degradation function and with the X scale inverted so that the predetermined outage time of the second uplink attenuation function and second downlink degradation function occur at zero availability for the first uplink attenuation function and first downlink degradation function;

and determining where the first uplink rain attenuation function intersects the second downlink rain degradation function to define a first point and determining where the second uplink rain attenuation function intersects the first downlink rain degradation function to define a second point;

uplink power control being required at the first site if the outage time at the first site is less than that at the first point and uplink power control is not required at the second site if the outage time allocated at the first site is less than that of the second point;

if the first point occurs at an outage time at the first site which is less than the outage time at the first site for the second point then uplink power control is not needed at either site for outage times at the first site between the two points; and if the first point occurs at an outage time at the first site which is greater than the outage time at the first site for the second point then uplink power control is needed at both sites for outage times at the first site between the two points.

13. The method of claim 8, wherein the system operates in any band subject to rain attenuation.

14. The method of claim 8, wherein the range where no uplink power control is required is calculated by performing the following steps:

a. solving TPD' (x1)=0 to obtain $x_{1m}$ which is the minimum transponder power point;

b. solving $f_{ru1}(x1)=f_{rd2}(x2)$ to obtain $x_{1L}$ which is a lower limit of non-uplink power control;

c. solving $f_{rd1}(x1)=f_{ru2}(x2)$ to obtain $x_{1u}$ which is an upper limit of non-uplink power control;

d. if $x_{1L} \leq x_{1m} \leq x_{1n}$ is true, then configuring links using $x_{1m}$ as the operating point;

e. if $x_{1L} > x_{1m}$, is true, then configuring links using $x_{1L}$ as the operating point;

f. if $x_{1u} < x_{1m}$, is true, then configuring links using $x_{1u}$ as the operating point;

g. if conditions determined in e or f exist, then increasing antenna gains at either end;

h. if $x_{1u} \leq x_{1L}$ is true, then configuring links using $x_{1m}$ as the operating point and using the difference between $f_{rd1}(x1)$ and $f_{ru3}(x2)$ to determine the amount of uplink power control required at the first site and likewise the difference between $f_{ru1}(x1)$ and $f_{rd2}(x2)$ to determine the amount of uplink power control at the second site.

* * * * *

UNITED STATES PATENT AND TRADEMARK OFFICE
CERTIFICATE OF CORRECTION

PATENT NO. : 5,815,796
DATED : September 29, 1998
INVENTOR(S) : Robert Athol Armstrong et al.

It is certified that error appears in the above-indentified patent and that said Letters Patent is hereby corrected as shown below:

Col. 10, line 16, "$f_{ru2}(x2)$" should read --$f_{rd2}(x2)$--.

Signed and Sealed this

Nineteenth Day of January, 1999

*Acting Commissioner of Patents and Trademarks*

Attest:

Attesting Officer